US007955663B2

(12) United States Patent
Mathur et al.

(10) Patent No.: US 7,955,663 B2
(45) Date of Patent: Jun. 7, 2011

(54) PROCESS FOR THE SIMULTANEOUS AND SELECTIVE PREPARATION OF SINGLE-WALLED AND MULTI-WALLED CARBON NANOTUBES

(75) Inventors: Rakesh Behari Mathur, New Delhi (IN); Chhotey Lal Nil, New Delhi (IN); Tersem Lal Dhami, New Delhi (IN); Bhanu Pratap Singh, New Delhi (IN); Anil Kumar Gupta, New Delhi (IN); Jagdish Ghawana, New Delhi (IN)

(73) Assignee: Council of Scientific and Industrial Research, New Delhi (IN)

( * ) Notice: Subject to any disclaimer, the term of this patent is extended or adjusted under 35 U.S.C. 154(b) by 644 days.

(21) Appl. No.: 11/934,816

(22) Filed: Nov. 5, 2007

(65) Prior Publication Data

US 2008/0217161 A1    Sep. 11, 2008

(30) Foreign Application Priority Data

Dec. 4, 2006  (IN) ............................ 2581/DEL/2006

(51) Int. Cl.
*H01T 14/00* (2006.01)
(52) U.S. Cl. .................. 427/580; 427/249.1; 427/249.3; 427/249.4; 427/903
(58) Field of Classification Search ............... 427/249.1, 427/249.3, 249.4, 903, 580
See application file for complete search history.

(56) References Cited

U.S. PATENT DOCUMENTS

| | | | | |
|---|---|---|---|---|
| 4,240,005 A * | 12/1980 | Keller | ...................... | 313/231.01 |
| 4,663,230 A | 5/1987 | Tennent | ...................... | 428/367 |
| 5,482,601 A | 1/1996 | Oshima | ...................... | 204/173 |
| 5,578,543 A | 11/1996 | Tennent et al. | ............... | 502/180 |
| 6,765,949 B2 * | 7/2004 | Chang | ............... | 373/2 |
| 6,884,405 B2 | 4/2005 | Ryzhkov | ................... | 423/447.1 |
| 6,955,800 B2 | 10/2005 | Resasco et al. | ............ | 423/447.3 |
| 7,008,605 B1 | 3/2006 | Benavides | ................. | 423/447.1 |
| 7,011,884 B1 | 3/2006 | Chow et al. | ..................... | 428/367 |
| 7,309,404 B2 | 12/2007 | Anazawa et al. | ............. | 204/173 |
| 7,468,097 B2 * | 12/2008 | Henley et al. | .................. | 95/139 |
| 2003/0010453 A1 * | 1/2003 | Tanaka et al. | ............ | 156/345.38 |
| 2004/0223901 A1 * | 11/2004 | Smalley et al. | ............ | 423/447.3 |
| 2006/0042162 A1 * | 3/2006 | Goldstein et al. | ................. | 48/61 |

OTHER PUBLICATIONS

Tarasov, Boris P., et al., "Synthesis of carbon nanostructures by arc evaporation of graphite rods with Co-Ni and YNi2 catalysts". Carbon 41 (2003) pp. 1357-1364.*

Wang, Q.H., et al., "Field Emission from nanotube bundle emitters at low fields". Applied Physics Letters 70 (24) Jun. 16, 1997, pp. 3308-3310.*
Bethune et al., "Cobalt-catalysed growth of carbon nanotubes with single-atomic-layer walls," *Nature*, 363 (17): 605-607, 1993.
Cheng et al., "Bulk Morphology and Diameter Distribution of Single-Walled Carbon Nanotubes Synthesized by Catalytic Decomposition of Hydrocarbons," *Chem. Phys. Lett.*, 289: 602-610, 1998.
Cheng et al., "Large-Scale and Low-Cost Synthesis of Single-Walled Carbon Nanotubes by the Catalytic Pryolysis of Hydrocarbons," *Appl. Phys.*, 72 (25): 3282-3284, 1998.
Cui et al., "Investigation on preparation of carbon nanotubes by dc arc diacharge under nitrogen atmosphere," *Carbon*, 42:931, 2004.
Ebbesen and Ajayan, "Large-scale synthesis of carbon nanotubes," *Nature*, 358: 220-222, 1992.
Gaaviilet et al., "Microscopic mechanisms for the catalyst assisted growth of single-wall carbon nanotubes," *Carbon*, 40 (10): 1649-1663, 2002.
Ijima et al., "Single-shell carbon nanotubes of 1-nm diameter," *Nature*, 363: 603-605, 1993.
Ijima, "Helical microtubules of graphitic carbon," *Nature*, 354: 56, 1991.
Ivanov et al., "The Study of Carbon Nanotubules Produced by Catalytic Method," *Chem. Phys. Lett.*, 223: 329-335, 1994.
Journet et al., "Large-scale production of single-walled carbon nanotubes by the electric-arc technique," *Nature*, 388:756-758, 1997.
Li et al., "Large-Scale Synthesis of Aligned Carbon Nanotubes," *Science*, 274 (5293): 1701, 1996.
Rinzler et al., "Large-Scale Purification of Single-Wall Carbon Nanotubes: Process, Product, and Characterization," *Applied Physics*, 67:29-37, 1998.
Saito, "High yield of single-wall carbon nanotubes by arc discharge using Rh—Pt mixed catalysts," *Chem. Phys. Lett.*, 294 (6): 593-598, 1998.
Thess et al., "Crystalline Ropes of Metallic Carbon Nanotubes," *Science*, 27 (5274): 483, 1996.

* cited by examiner

*Primary Examiner* — Bret Chen
(74) *Attorney, Agent, or Firm* — Fulbright & Jaworski LLP

(57) ABSTRACT

Processes for the simultaneous and selective growth of single walled and multiwalled carbon nanotubes in a single set of experiments are disclosed. The processes may include preparing a graphite electrode rod containing catalyst selected from Fe, Co, Ni, and a mixture thereof, acting as an anode. The process may include preparing another graphite electrode rod, each electrode having a distal and a proximal end. The process may include placing the above said two electrodes parallel to each other and their axis being substantially aligned in a chamber. The process may further include creating a DC-arc discharge inside the chamber by applying a DC-current voltage. The process may further include an cooling assembly having a cooling coil that surrounds the two electrodes. The cooling assembly may be used to maintain a temperature gradient that permits the depositing of single walled and multiwalled carbon nanotubes simultaneously in one experiment.

12 Claims, 7 Drawing Sheets

SCHEMATIC DIAGRAM OF DC-ARC DISCHARGE GENERATOR

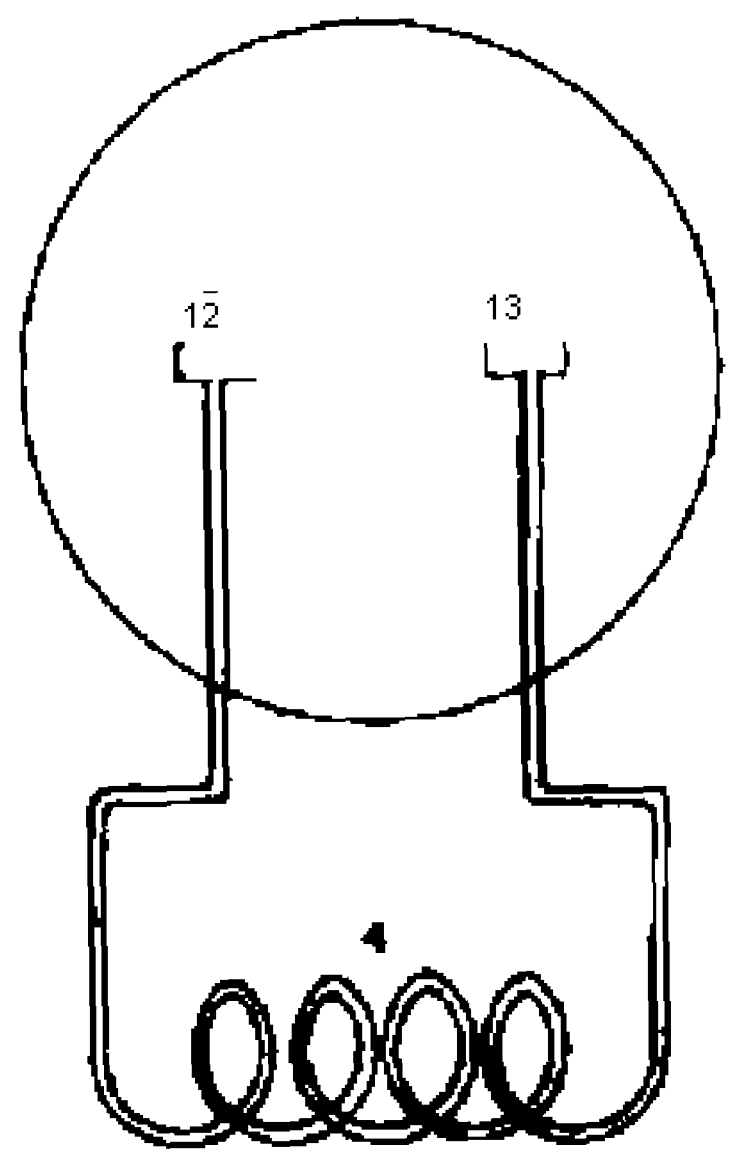
Figure 2 Cooling Device

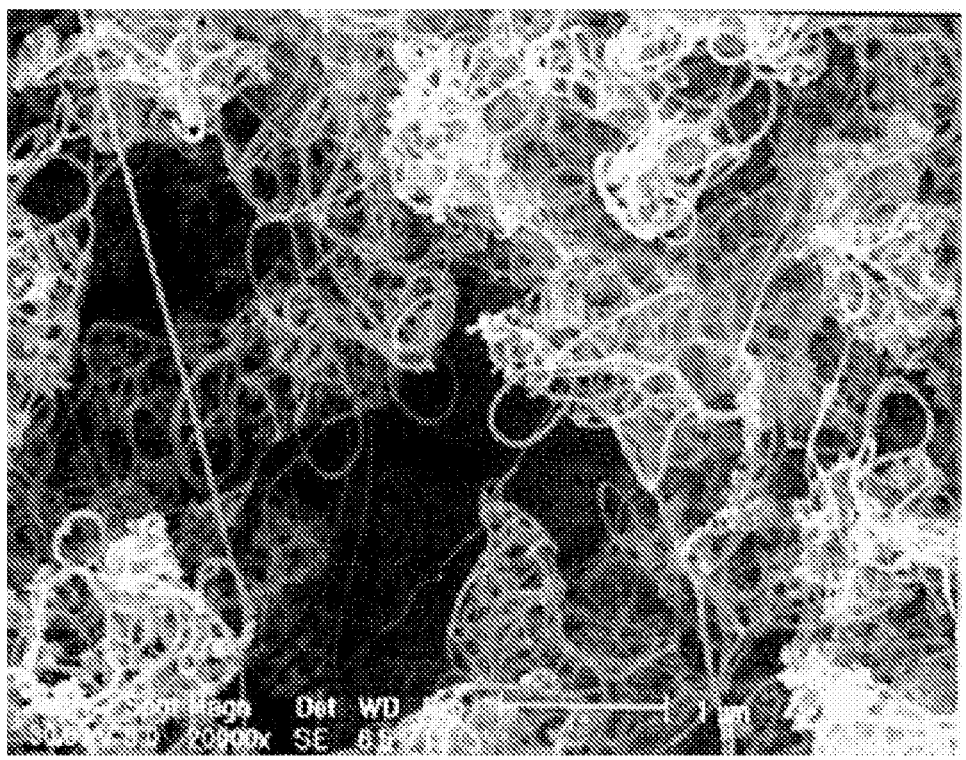
Fig.3 SEM micrograph of the chamber deposit showing the presence of long and flexible carbon nanotubes

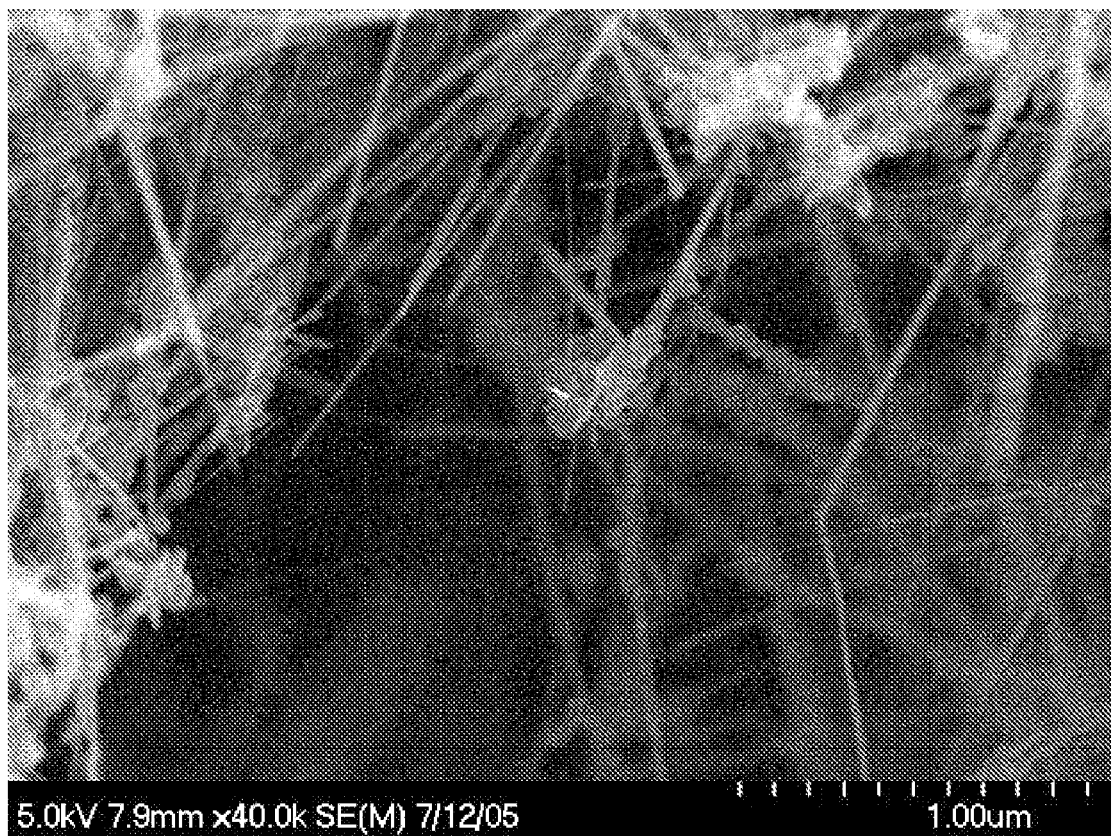
Fig.4 SEM micrograph of the cathode deposit showing the presence of straight MWNTs

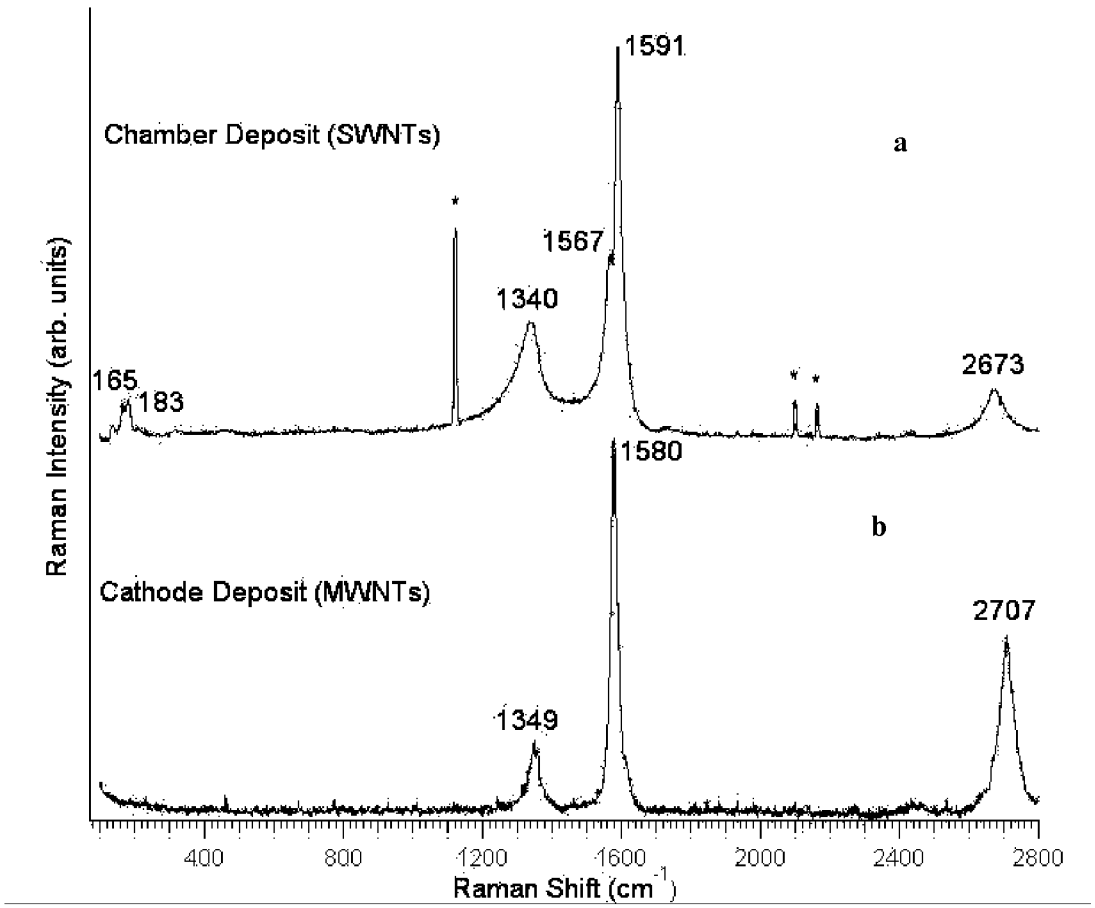
Fig.5 Room temperature Raman spectra of the chamber and cathode deposit. Chamber deposit (a) shows the presence of SWNTs and The Cathode deposit(b) shows the presence of MWNTs

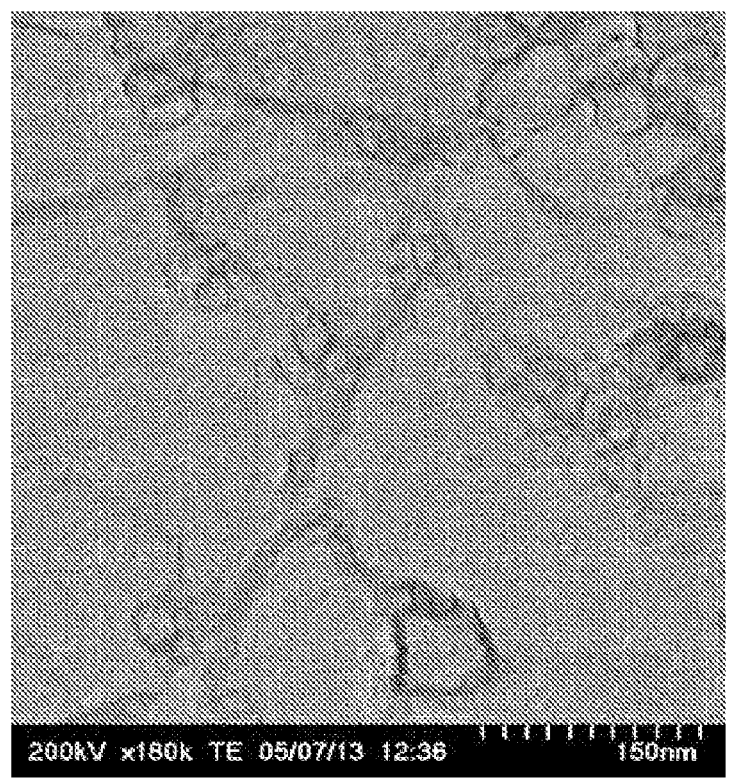
Fig.6 : TEM micrograph of the chamber deposit showing the presence of SWNTs

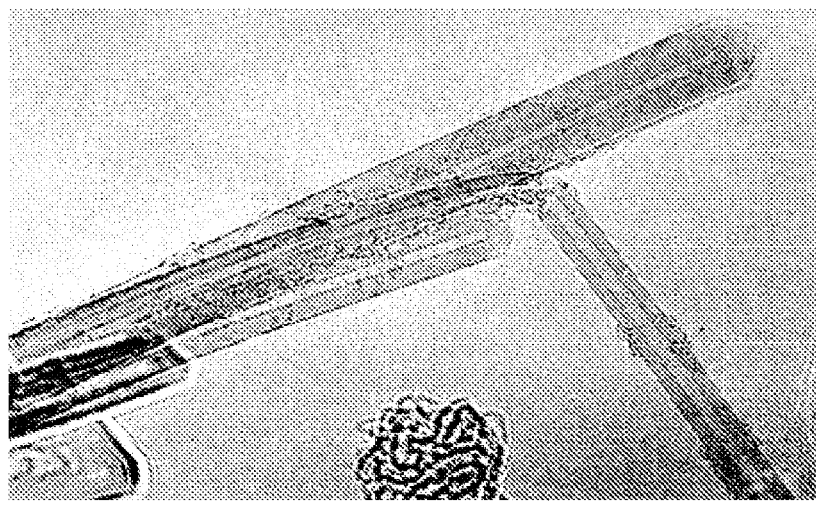
Fig.7 TEM micrograph of the cathode deposit showing the presence of MWNTs and graphite nanoshells

PROCESS FOR THE SIMULTANEOUS AND SELECTIVE PREPARATION OF SINGLE-WALLED AND MULTI-WALLED CARBON NANOTUBES

FIELD OF THE INVENTION

The present invention relates to a process for simultaneous and selective preparation of single walled and multi-walled carbon nanotubes.

Carbon nanotubes (also referred to as carbon fibrils) are seamless tubes of graphite sheets with full fullerene caps which were first discovered as multilayer concentric tubes or multi-walled carbon nanotubes and subsequently as single-walled carbon nanotubes in the presence of transition metal catalysts. Carbon nanotubes are fascinating structures for fundamental science and technological applications e.g. super strong composites, field emission display devices, hydrogen storage, AFM tips, and drug delivery systems etc.

Generally, single-walled carbon nanotubes are preferred over multi-walled carbon nanotubes for use in these applications because they have fewer defects and are therefore stronger and more conductive than multi-walled carbon nanotubes of similar diameter. Defects are less likely to occur in single-walled carbon nanotubes than in multi-walled carbon nanotubes because multi-walled carbon nanotubes can survive occasional defects by forming bridges between unsaturated carbon valances, while single-walled carbon nanotubes have no neighboring walls to compensate for defects.

However, the availability of these new single-walled carbon nanotubes in quantities necessary for practical technology is still problematic. Large scale processes for the production of high quality single-walled carbon nanotubes are still needed. Presently, there are three main approaches for synthesis of carbon nanotubes. These include the laser ablation of carbon (Thess, A. et al., *Science*, 273:483, 1996), the electric arc discharge of graphite rod (Journet, C. et al., *Nature*, 388: 756, 1997), and the chemical vapor deposition of hydrocarbons (Ivanov, V. et al., *Chem. Phys. Lett*, 223:329, 1994; Li A. et al., *Science*, 274:1701, 1996). The production of multi-walled carbon nanotubes by catalytic hydrocarbon cracking is now on a commercial scale (U.S. Pat. No. 5,578,543) while the production of single-walled carbon nanotubes is still in a gram scale by laser (Rinzler, A. G. et al., *Appl. Phys. A.,* 67:29, 1998) and arc (Journet, C. et al., *Nature*, 388:756, 1997) techniques.

The synthesis of nanotubes in experimental quantities using a standard carbon arc method has been accomplished for several years. Production of nanotubes typically consists of placing water-cooled carbon electrodes of amorphous carbon or graphite rods approximately one millimeter apart within a vacuum chamber, evacuating the chamber to a pressure of approximately 10.sup.−7 torr, backfilling the chamber with an inert gas such as helium, nitrogen, argon or hydrogen to pressures ranging from approximately 50 to 500 torr, striking a high current electrical arc between the electrodes while continually adjusting them to maintain the one millimeter electrode gap. In this process, the ability to create an inert gas atmosphere is essential. The result is a growth of carbon nanotubes and other small carbon particles on the negative electrode. The quantity of nanotubes produced in the electrode deposits depends on how long optimum growth conditions can be maintained.

In such experimental setups, a DC voltage of about 18V is applied between two carbon electrodes in a chamber under about 500 torr of helium. A plasma forms between the closely-spaced electrodes. Carbon accumulates on the negative electrode and grows as the positive electrode is consumed. When the correct electrode spacing is maintained, the deposit grows into a cylindrical structure with an outer hard shell and an inner soft fibrous core. The gray outer shell is composed of carbon nanotubes and other carbon nanoparticles fused into a hard mass, probably due to excessive current passing through it. The soft black inner core contains free nanotubes and nanoparticles in the form of fibers where the fibers are aligned with the direction of current flow between the electrodes.

In order to produce any substantial number of carbon nanotubes, it is a typical practice to employ a larger diameter graphite rod as the cathode and a relatively smaller diameter graphite rod as the anode. Initially, at least, the electrodes have flat and parallel opposing faces. Since the anode rod is consumed as the arc discharge proceeds, one of the electrodes must be moved to displace a constant gap. Furthermore, it is desirable to move the anode with respect to the cathode so as to expose a fresh surface for deposition of the nanosize particle products. U.S. Pat. No. 5,482,601 to Oshima et al, for example, describes a mechanism for the production of carbon nanotubes in an inert gas-containing chamber. The complicated mechanism is required to position the two electrodes in the chamber and move them with respect to each other as the DC arc causes the production of the carbon nanotubes. As disclosed, it is also desirable to provide a scraper to shear the deposited nanotubes and other nanoparticles from the surface of the cathode. All of this is to be accomplished without altering the pressure of the inert gas in the chamber and while maintaining a suitable gap between the electrodes for the production of the plasma and the deposition of the carbon nanotubes.

There are several efforts reported in the open literature/ patents wherein carbon nanotubes have been synthesized by dc-arc discharge technique. The biggest challenge comes from obtaining large quantities of pure nanotubes free from, catalyst, amorphous carbons, carbon nanoshells etc. The carbon Nanotubes prepared by the technology can be extended to various applications.

Reference may be made to Iijima's work [S. Iijima, Nature, 354, 1991, 56] who first discovered carbon nanotubes in the carbon soot obtained from carbon arc-discharge process. These nanotubes were multiwalled only, with diameter ranging from 10 to 25 nm. In their later experiments, Iijima [S. Iijima et. al. Nature, 363, 1993, 603] produced single walled carbon nanotubes by using transition metal catalyst. They however, did not report the existence of MWNTs. Ebbesen et. al [T. W. Ebbesen and P. M. Ajayan, Nature 358, 1992, 220] produced Multi walled carbon nanotubes as cathode deposit in gram quantity by applying potential of ~18V between two graphite rods inside a reaction vessel with flowing He or Ar atmosphere. Using almost similar set-up Bethune et. al [D. S. Bethune, Nature, 363, 1993, 605] and Journet [C. Journet, Nature, 388, 1997, 756] produced SWNTs in the form of spider webs or ropes inside the reactor by drilling a hole in the anode and filling it up with catalyst powder comprising of Ni, Co, Fe or combinations of Ni—Y, Co—Y in different atomic percents. A He atmosphere of 660 mbar and voltage of ~30V was used to strike the arc. In the dc-arc discharge setup the cooling was provided to the whole chamber by water circulation. Saito et. al. [Y. Saito, Chem. Phys. Lett. 294, 1998, 593] used Rh—Pt as mixed catalyst to produce carbon nanotubes by dc-Arc discharge technique. The purity of the graphite rods was 99.998% and that of metal powder higher than 99.9%. This caused the process to be much costlier. The TEM micrographs showed the presence of SWNTs predominantly in the cathode deposit and almost no trace in chamber soot was available. Similar observation was made with Fe—Ni system. In a relatively recent study Gaviillet et. al. [J. Gaviillet et. al. Carbon 40, 2002, 1649] produced good yield of carbon nanotubes containing soot in the dc-arc discharge reactor by using combinations of Ni/Y: 100/0, 80/20, 50/50, 20/80, 0/100. The tubes found on the cathode contained small amount of Y catalyst as well. The studies helped in understanding the growth mechanism of carbon nanotubes. Cui et. al [S. Cui, Carbon 42, 2004, 931] reported investigation on preparation of multiwalled CNT by dc arc discharge under $N_2$ atmosphere. U.S. Pat. No. 7,008,605 describes a process where CNTs have been produced non-catalytically by creating an electric arc between carbon anode and carbon cathode in the open atmosphere. U.S. Pat. No. 7,011,884 describes a process of manufacturing CNTs with an integrally attached outer graphitic layer on CNTs. U.S. Pat. No. 4,663,230 describes a process of producing multi-walled carbon nanotubes using catalysts containing iron, cobalt or nickel at temperatures between 850° C. to 1200° C. Recently, rope-like bundles of single-walled carbon nanotubes were generated from the thermal cracking of benzene with iron catalyst and sulfur additive at temperatures between 1100-1200° C. (Cheng, H. M. et al., *Appl. Phys. Lett.*, 72:3282, 1998; Cheng, H. M. et al., *Chem. Phys. Lett.*, 289:602, 1998). U.S. Pat. No. 6,955,800 describes a process of producing CNTs where catalytic particles are exposed to different process conditions at successive stages wherein the catalytic particles do not come in contact with reactive (catalytic) gases until preferred process conditions have been attained, thereby controlling the quantity and form of carbon nanotubes produced. Ryzhkov et. al [Ryzhkov, Vladislav Andeevitch, US pat. 20020122754, Sep. 5, 2002] describes a process in which fullerene/nanotubes mixture is produced during a periodical pulsed autoregulated action of the electric current arc-discharge in the multi component hydrocarbon medium. Kazunori Anazawa et. al. [K. Anazawaa et. al. U.S. patent No. 20040168904, Sep. 2, 2004] describes a process to produce carbon nanotubes by striking arc between two electrodes, using a porous carbonaceous material for at least one of the two electrodes.

OBJECTIVES OF THE INVENTION

The main object of the present invention is to provide a process for the simultaneous and selective growth of single walled and multi-walled carbon nanotubes in the single experiment on the arc-discharge setup which obviates the drawbacks as detailed above.

Another object of the present invention is to increase the yield of carbon nanotubes per run by using a specially prepared carbon composite electrode.

Yet another object of the present invention is to create a suitable temperature gradient around the cathode by using an ingenious device.

Yet another object of the present invention is to produce catalyst free MWNTs at the cathode.

BRIEF DESCRIPTION OF THE DRAWINGS

FIG. 2 represents Ingenious-cooling device.
FIG. 3 represents SEM micrograph of Chamber deposit showing nanotubes webs.
FIG. 4 represents SEM micrograph of cathode deposit showing straight nanotubes.
FIG. 5(*a*) represents Raman micrograph of the Chamber soot showing presence of SWNTs.

FIG. 5(*b*) represents Raman micrograph of the cathode deposit soot showing presence of MWNTS.
FIG. 6 TEM micrograph of the chamber deposit showing presence of SWNTs.
FIG. 7 TEM micrograph of the cathode deposit showing presence of MWNTs.

SUMMARY OF THE INVENTION

Figure 1:
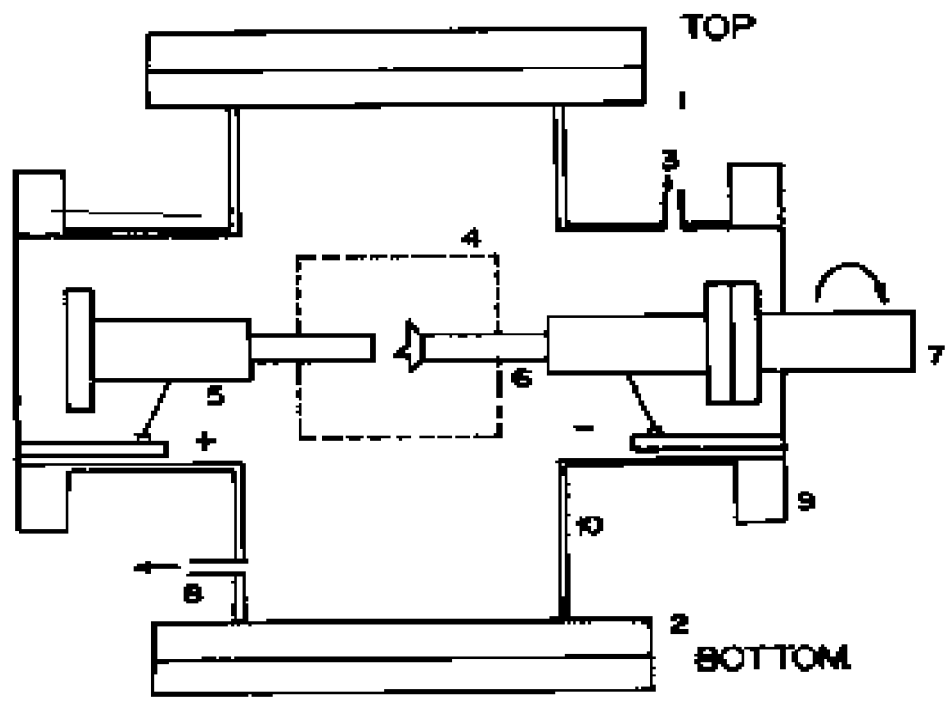
FIG. 1 represents the dc-arc discharge set-up.

Accordingly the present invention provides a process for the simultaneous and selective growth of single walled and multiwalled carbon nanotubes which comprises preparing a graphite electrode rod containing catalyst selected from Fe, Co, Ni and a mixture thereof, acting as an anode and another graphite electrode rod acting as a cathode each electrode having a distal and a proximal end, placing the above said two electrodes parallel to each other and their axis being substantially aligned such that their distal ends are at least 1 mm apart, in a closed and evacuated arc discharge chamber, creating a DC-arc discharge inside the above said chamber by applying a DC-current voltage in the range of 10-50 V, at an arc current of 50-200 amp, under inert gas pressure of 120-500 torr followed by cooling the system by maintaining a temperature gradient by using a cooling coil around the arching electrodes, to obtain simultaneously the desired deposition of multiwalled carbon nanotubes at the cathode and the single walled carbon nanotubes in the chamber.

In an embodiment of the present invention the anode electrode is made by filling the catalyst in a hole drilled in the graphite electrode or is a composite graphite electrode containing uniformly distributed catalyst.

In yet another embodiment the anode electrode or composite graphite electrode used comprises coke, binder pitcher and uniformly distributed catalyst.

In yet another embodiment the electrodes used are in the form of rods of diameter in the range of 8-20 mm.

In yet another embodiment the cooling coil used for maintaining the temperature gradient is made of Copper.

In yet another embodiment the multiwalled carbon nanotubes deposited at the cathode are free from catalyst impurities.

In yet another embodiment the DC-current voltage used is preferably in the range of 20-25 V.

In still another embodiment the DC-current used is preferably in the range of 50-150 amp.

In still another embodiment the inert gas used is selected from Nitrogen, Argon and Helium.

DETAILED DESCRIPTION OF THE INVENTION

The present process of synthesizing single walled and multi walled carbon nanotubes simultaneously in the same experiment by Dc-arc discharge technique employs a self synthesized carbon anode electrode having uniformly distributed catalyst. The process also employs an ingenious device inside the arc chamber to produce desired temperature gradient around the arcing electrodes. The process ensures the synthesis of single walled and almost catalyst free multi walled carbon nanotubes simultaneously in the same experiment.

The present invention provides a process for the simultaneous growth of single walled and multiwalled carbon nanotubes in the same set of experiment, which comprises:

An airtight chamber in which an arc discharge is to be carried out. An axially extending rod-like anode 5 having a distal and a proximal end is horizontally disposed within the chamber 10. The anode 5 is formed of a carbonaceous material such as carbon, graphite or metal-containing graphite. The metal of the metal-containing graphite may be, for example, copper, iron or cobalt or nickel. The diameter of the anode is generally 5-30 mm, preferably 6-15 mm. The anode is supported by a holder having a hole to fix the anode electrode. The holder is electrically connected to a positive pole of a direct current source. A cathode 6 is also disposed within the chamber 10 such that the cathode surface is oriented parallel to the axis of the rod-like anode. It is important that the area of the cathode surface is larger than that of the anode 5. The cathode 6, which is formed of a heat-resisting conductive material such as a metal, e.g. copper, or a carbonaceous material such as carbon, graphite or metal-containing graphite, is in the form of a cylinder having a distal and a proximal end whose axis is oriented in parallel with the axis of the anode 5 and their axis are substantially aligned such that the distal end of electrodes are at least 1 mm apart. The cathode 6 is supported by a holder having a hole to fix the cathode electrode. The holder is electrically connected to a negative pole of a direct current source. The cylindrical cathode 6 has a proximal end surface which is opposite to the cathode distal end surface, and to which a coaxial, electrically insulating shaft is secured for rotation with the cathode 6. The shaft extends out of the chamber 10 and is connected to a driving mechanism including an electric stepper motor 7 for rotating the shaft.

As a result of the above construction, by mounting the rod-like anode 5 on the holder, the distal end surface faces in the direction of the distal end surface of the cathode 6. By operating the stepper motor, the gap between the distal end surface of the anode 5 and the cathode distal end surface is adjustable at will.

Designated as 3 is the opening of an inert gas such as helium, argon or nitrogen for feeding the inert gas with a controlled pressure to the chamber 10.

The chamber consisted of an ingenious cooling assembly 4 surrounding the electrodes. Such type of assembly has not been used by any previous inventors. The assembly consists of specially designed cooling device, the distance of which could be varied w.r.t. the electrodes so as to main proper thermal gradient inside the chamber during arcing. The assembly, shown in FIG. 2, is made of copper tube in the form of a coil. The diameter of the copper tube can vary from 6 mm to 20 mm and preferably from 8 to 12 mm. The coil is fixed to the base plate 11 through SWAGELOK® tube fittings 12 and 13. Both the electrodes anode and cathode can be changed at will. This ingenious cooling device helped in the growth of SWNTs around it in the form of webs and sheets. This was not possible without the assembly and the carbon material formed was either amorphous or contained small amounts of MWNTs. No SWNTs were found to be present without the use of the device.

A method of producing carbon nanotubes according to the present invention using the device of FIG. 1 will be now described.

In starting up, A graphite rod, 6-15 mm diameter preferably 8-10 mm diameter was filled with the catalysts consisting of Fe, Co and Ni or mixture thereof, and used as anode. The other graphite rod, 10-20 mm diameter preferably 12-14 mm diameter was used as cathode. The cathode (mobile) moves towards the anode (stationary) by auto controlled stepping up motor as described earlier maintaining desired arcing distance. The anode and cathode electrodes are fixed in the chamber and the chamber is closed and evacuated, with the help of vacuum pump which consisted of rotary vacuum pump along with diffusion pump, to reduce the pressure within the chamber 10 to 0.1-760 Torr, preferably 1-20 Torr.

Helium/Argon/Nitrogen gas preferably Helium gas is then fed from the source to the chamber 10 and the helium gas pressure is maintained at 10 Torr to 2 atm, preferably at 100 to 700 Torr. Thereafter, stepper motor is operated to adjust the distance between the distal end surface of cathode 6 and the anode distal end surface to generally 0.1-5 mm, preferably 0.5-2 mm, while applying the direct current voltage of generally 10-50 V, preferably 25-35 V there between, so that an arc discharge occurs with the simultaneous deposition of a carbonaceous material containing carbon nanotubes on the tip of the cathode surface 6 which is adjacent to the distal end surface of the anode 5 as well as on the surface of copper coil and inside surface of chamber. The DC current in this case is controlled to 100-200 A and preferably 100-150 A. While continuing the arc discharge, the driving mechanism 7 is continuously operated to rotate the cathode 6 and to change the relative position between the distal end surface of the cathode and the anode surface. The rotational speed may be such that the average running speed of the distal end surface of the cathode relative to the anode surface ranges from 1 to 10 mm/minute. The distance between the cathode distal end surface and the distal end surface of anode is also controlled in the above range since the anode 5 is consumed as the arc discharge proceeds. Upon completion of the arcing process the system is allowed to cool down and carbonaceous material deposited at the cathode, inside walls of the chamber and surrounding the copper coil are collected.

In a feature of the present invention single walled carbon nanotubes can be synthesized by the dc-arc discharge of carbon electrode.

In yet another feature under the present invention catalyst free MWNTs may be synthesized in the same experiment.

In yet another feature of the present invention a catalyst containing carbon electrode was synthesized to ensure uniform distribution of catalyst particles.

In still another feature of the present invention an ingenious device was assembled inside the arc chamber to produce desired temperature gradient around the arcing electrodes.

Another feature of the invention is the use of specially prepared carbon composite electrode that ensured uniform dispersion of catalyst whereby maximum number of carbon atoms and chains are in contact with catalyst during arc evaporation.

Upon completion of the arcing process, the inner walls of the chamber were coated with web-like deposits which could be readily peeled away as a rolled-up fibrous mat. A typical SEM micrograph of such material (FIG. 3) revealed a multitude of nanotubes or ropes in the mat. These nanotubes are entangled with amorphous soot and catalyst particles (or catalyst encapsulated in graphitic nanoshells). In addition, a large amount of straight micro-structures aligned preferentially along the length of the cathode (or electric field) was also found. This "cathode deposit" is depicted in FIG. 4. The cathode deposit comprised of graphitized carbon and sharp needle-like structures. Upon detailed microscopic examination, these needles resembled the MWNT structure with an outer diameter of ~20-25 nm.

The Raman spectra of these two deposits are shown in FIGS. 5(a) and 5(b). The chamber deposit comprised of SWNT bundles since its Raman spectrum (FIG. 5(a)) showed the presence of the radial breathing and tangential bands at 165-183 and 1591 cm$^{-1}$ respectively. The TEM image of the material (FIG. 6) shows the presence of SWNTs alongwith the graphite nanoshells. The strong G-band at 1580 cm$^{-1}$ in FIG. 5(b) and the TEM image in FIG. 7 suggest that the cathode deposit is predominantly comprised of MWNTs. The prominent D-band seen in both the spectra is attributed to the presence of disordered carbon material present in the deposit. Several runs under similar conditions were carried out to collect sufficient amount of carbon deposits. These were found to be of reproducible quality and the production rate of total deposit (chamber+cathode) per run was estimated to be around 5-8 gms. The total time taken to consume a ~6 cm long electrode was about 30 minutes. We also found that the amount of webs in the chamber deposits obtained with 2 at. % Ni/Co catalyst were almost double than that obtained with 1 at. % of the same catalyst composition. However, the length of the cathode deposit was relatively shorter in the latter case. Energy dispersive spectroscopic (EDS) analysis of the two deposits showed that the cathode deposit did not contain any metal impurity while the chamber deposit contained ~36 wt. % catalyst (Table 1).

The novelty of the invention lies in obtaining a desired temperature gradient by cooling the arc chamber by using a cooling coil around the electrodes in the said chamber so as to obtain the simultaneous deposition of MWCNTs at the cathode and SWCNTs in the chamber.

The following examples are given by way of illustration and therefore should not be construed to limit the scope of the present invention.

Example-1

3 mm dia hole was drilled in one of the graphite electrodes of diameter 8 mm and length 60 mm. The hole was filled with 2 at % Ni and 2 at % Co powder, purity 99.9%. This electrode was arced against a cathode of dia. 10 mm. A current of 100 A and 20 Volts was maintained during arcing. Helium pressure was maintained at 300 torr. The electrode was moved to and fro by stepping up motor to maintain 1 mm separation between the electrodes to achieve suitable arcing condition during the arcing process. The soot which was collected from the chamber, contained small amount of SWNTs, whereas the cathode deposit comprised of almost 80% of the total evaporated carbon and contained mostly MWNTs.

Example-2

3 mm dia hole was drilled in one of the graphite electrodes of diameter 8 mm and length 60 mm. The hole was filled with 2 at % Ni and 2 at % Co powder, purity 99.9%. This electrode was arced against a cathode of dia. 10 mm. A current of 100 A and 20 Volts was maintained during arcing. Helium pressure was maintained at 500 torr. The electrode was moved to and fro by stepping up motor to maintain 1 mm separation between the electrodes to achieve suitable arcing condition during the arcing process. The soot which was collected from the chamber, contained 50% more of SWNTs compared to previous experiment, whereas the cathode deposit comprised of almost 80% of the total evaporated carbon and contained mostly MWNTs.

Example-3

3 mm dia hole was drilled in one of the graphite electrodes of diameter 8 mm and length 60 mm. The hole was filled with 4 at % Ni and 4 at % Co powder, purity 99.9%. This electrode was arced against a cathode of dia. 10 mm. A current of 100 A and 20 Volts was maintained during arcing. Helium pressure was maintained at 500 torr. The electrode was moved to and fro by stepping up motor to maintain 1 mm separation between the electrodes to achieve suitable arcing condition during the arcing process. The carbon soot which was collected from the chamber was found to be doubled as compared to the soot in example 1. The amount of catalyst in the soot as measured by EDS was also found to be 36% by wt. of the total soot deposits. Additionally, the soot was also found to contain amorphous carbon and confirmed by Thermal Gravimetric Analysis. The cathode deposit weigh about 70% of the total carbon evaporated during the arcing.

Example-4

3 mm dia hole was drilled in one of the graphite electrodes of diameter 8 mm and length 60 mm. The hole was filled with the catalyst comprising of 3% Y+2% Ni+2% Co, purity 99.9%. This electrode was arced against a cathode of dia. 10 mm. A current of 100 A and 20 Volts was maintained during arcing. Helium pressure was maintained at 500 torr. The electrode was moved to and fro by stepping up motor to maintain 1 mm separation between the electrodes to achieve suitable arcing condition during the arcing process. The carbon soot which was collected in the chamber was found to contain sea urchin like deposits when viewed under the SEM. The tubes were of much shorter length as compared to one produced in examples 1-3. The amount of catalyst in the soot as measured by EDS was also found to be >36% of the total soot deposits. Additionally, the soot was also found to contain amorphous carbon and confirmed by Thermal Gravimetric Analysis. The cathode deposit weigh about 70% of the total carbon evaporated during the arcing.

Example-5

Graphite anode comprised of self-synthesized composite electrode containing, coke, binder pitch and the catalyst Ni and Co 2 at % each. The processing of the electrode ensured that all the catalyst was distributed uniformly within the electrode, which was machined to 8 mm OD. A 10 mm uniform diameter, 60 mm long synthetic graphite electrode (99.9% pure carbon), was used as cathode. A constant current of 100 A at 20V was maintained between the electrodes during arcing. The pressure of He inside the chamber was maintained at ~500 torr. The arc gap of ~1 mm was maintained through a stepper motor connected to cathode. The soot which was collected from the chamber, contained 50% more of SWNTs compared to previous experiment, whereas the cathode deposit comprised of almost 80% of the total evaporated carbon and contained mostly MWNTs.

According to the present invention, it is possible to synthesize directly single wall carbon nanotubes and catalyst free multiwalled carbon nanotube separately. This has been possible by modifying the cooling profile or temperature gradient inside the chamber by employing an ingenious device. The system is capable of growing sufficient amount of web like structure around the device. Another novelty of the technique is the use of graphite composite electrode that ensured uniform dispersion of catalyst whereby maximum number of carbon atoms and chains are in contact with catalyst during arc evaporation.

TABLE 1

EDS analysis of deposits containing carbon nanotubes produced inside the de-arc discharge reactor

| Sample description | Element | As-produced sample (% by weight) |
|---|---|---|
| Chamber deposit | C | 60.00 |
|  | O | 2.99 |
|  | Ni | 18.22 |

TABLE 1-continued

EDS analysis of deposits containing carbon nanotubes produced inside the de-arc discharge reactor

| Sample description | Element | As-produced sample (% by weight) |
|---|---|---|
| Cathode deposit | Co | 18.79 |
|  | C | 95.14 |
|  | O | 4.86 |
|  | Ni | — |
|  | Co | — |

The main advantages of the present invention are:
1. Single walled as well as Multi walled carbon nanotubes can be synthesized simultaneously in the same arc discharge set-up and in single experiment.
2. By using the process the amount of carbon nanotubes in the arc soot are found to be doubled as compared to conventional process.
3. In this development process the multi walled CNTs are synthesized free from catalyst impurities.

The invention claimed is:

1. A process for the simultaneous and selective growth of single walled and multiwalled carbon nanotubes which comprises:
preparing a graphite electrode rod containing catalyst selected from Fe, Co, Ni, and a mixture thereof, acting as an anode;
preparing another graphite electrode rod, acting as a cathode, each electrode having a distal and a proximal end;
placing the above said two electrodes parallel to each other and their axis being substantially aligned such that their distal ends are at least 1 mm apart and in a closed and evacuated arc discharge chamber;
creating a DC-arc discharge inside the above said chamber by applying a DC-current voltage in the range of 10-50 V, at an arc current of 50-200 amp, under inert gas pressure of 120-500 torr; and
followed by cooling the said two electrodes by maintaining a temperature gradient by using a cooling assembly having a cooling coil surrounding the said two electrodes, to obtain simultaneously the desired deposition of the multiwalled carbon nanotubes at the cathode and the single walled carbon nanotubes in the chamber;
wherein the proximal end of the graphite electrode acting as the cathode is connected to an electrically insulated shaft extending out of the chamber.

2. The process according to claim 1, wherein the anode electrode is made by filling the catalyst in a hole drilled in the graphite electrode or is a composite graphite electrode containing uniformly distributed catalyst.

3. The process according to claim 1, wherein the anode electrode or composite graphite electrode used comprises coke, binder pitch and uniformly distributed catalyst.

4. The process according to claim 1, wherein the electrodes used are in the form of rods of diameter in the range of 8-20 mm.

5. The process according to claim 1, wherein the cooling coil used for maintaining the temperature gradient is made of Copper.

6. The process according to claim 5, wherein the Copper cooling coil comprises a tube of diameter falling within the range of 8 to 12 mm.

7. The process according to claim 1, wherein the multi-walled carbon nanotubes deposited at the cathode are free from catalyst impurities.

8. The process according to claim 1, wherein the DC-current voltage used is in the range of 20-25 V.

9. The process according to claim 1, wherein the DC-current used is in the range of 50-150 amp.

10. The process according to claim 1, wherein the inert gas used is selected from Nitrogen, Argon and Helium.

11. The process according to claim 1, wherein the cooling coil has a variable varying distance from said two electrodes.

12. The process according to claim 1, wherein the electrically insulated shaft is connected to a driving mechanism for rotating the shaft.

* * * * *

UNITED STATES PATENT AND TRADEMARK OFFICE
CERTIFICATE OF CORRECTION

| | | |
|---|---|---|
| PATENT NO. | : 7,955,663 B2 | Page 1 of 1 |
| APPLICATION NO. | : 11/934816 | |
| DATED | : June 7, 2011 | |
| INVENTOR(S) | : Rakesh Behari Mathur et al. | |

It is certified that error appears in the above-identified patent and that said Letters Patent is hereby corrected as shown below:

In claim 11, column 10, line 34, delete "variable".

Signed and Sealed this
Eighth Day of November, 2011

David J. Kappos
*Director of the United States Patent and Trademark Office*